United States Patent [19]
Grasshoff et al.

[11] 3,936,401
[45] Feb. 3, 1976

[54] NOVEL POLYMERIC DERIVATIVES OF TETRAZOLE-5-THIOLS AND THEIR METAL AND AMMONIUM SALTS

[75] Inventors: J. Michael Grasshoff, Hudson; Jerome L. Reid, Wayland, both of Mass.

[73] Assignee: Polaroid Corporation, Cambridge, Mass.

[22] Filed: Nov. 5, 1974

[21] Appl. No.: 520,983

Related U.S. Application Data

[63] Continuation-in-part of Ser. No. 429,900, Jan. 2, 1974, abandoned.

[52] U.S. Cl.................... 260/8; 260/78 R; 260/79; 260/308 D
[51] Int. Cl.².......................................... C08L 89/00

[58] Field of Search............ 260/79, 8, 308 D, 78 R

[56] References Cited
UNITED STATES PATENTS
3,625,684   12/1971   Poot et al. ............................ 260/79
3,762,927   10/1973   Haas ...................................... 260/8

Primary Examiner—Melvyn I. Marquis
Attorney, Agent, or Firm—Susan M. Cooke; Esther A. H. Hopkins

[57] ABSTRACT

Novel polymeric derivatives of tetrazole-5-thiols and their metal and ammonium salts, and the preparation of such compounds which are useful as gelatin thickeners or in their production, are disclosed.

17 Claims, No Drawings

NOVEL POLYMERIC DERIVATIVES OF TETRAZOLE-5-THIOLS AND THEIR METAL AND AMMONIUM SALTS

BACKGROUND OF THE INVENTION

This is a continuation-in-part of U.S. application Ser. No. 429,900 filed Jan. 2, 1974 and now abandoned.

The present invention is concerned with novel polymeric derivatives of tetrazole-5-thiols and their metal and ammonium salts, and with the preparation of such compounds.

Tetrazole-5-thiols may exist as tautomers of a 1,2,3,4- or 2,1,3,4-tetrazole. As disclosed in U.S. Pat. No. 2,403,927 and No. 2,452,506, the 1,2,3,4-tetrazole-5-thiol,

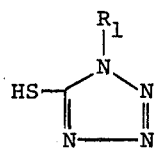

may have the general tautomeric formulae:

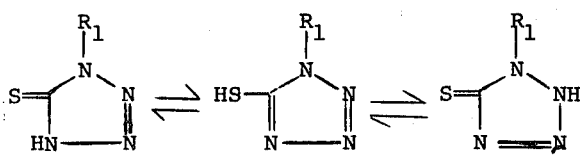

wherein $R_1$ is hydrogen or a hydrocarbon substituent group.

Viscous polymeric derivatives of these tetrazoles may be utilized in systems requiring a thickener, as in a gelatin layer of a photographic emulsion. Although it has been possible to provide a high molecular weight polymeric chain for tetrazole moieties having no thio substituents [see U.S. Pat. No. 3,753,956 and No. 3,576,638], this has not been the case with sulfur containing tetrazoles. When polymerization of a reactive sulfur containing monomer is attempted, the sulfur tends to scavenge radicals so as to stop chain growth. Furthermore, cross-linking may occur due to the formation of disulfide bridges between the polymeric chains.

OBJECTS OF THE INVENTION

It is therefore a primary object of this invention to provide novel polymeric derivatives of tetrazole-5-thiols and their salts. Another object of this invention is to provide a procedure for preparing such novel compounds.

A further object is to provide compounds which can increase the viscosity of gelatin utilized in photographic emulsions.

Other objects, features and advantages of this invention will be obvious or will appear hereinafter.

SUMMARY OF THE INVENTION

It has now been found that polymeric derivatives of tetrazole-5-thiols and their metal and ammonium salts can be prepared. Soluble metal salts of these tetrazoles may be utilized to increase the viscosity of gelatin in photographic emulsions.

DETAILED DESCRIPTION OF THE INVENTION

Illustrative of the polymeric derivatives of tetrazole-5-thiols and their metal and ammonium salts disclosed in this invention are those selected from:

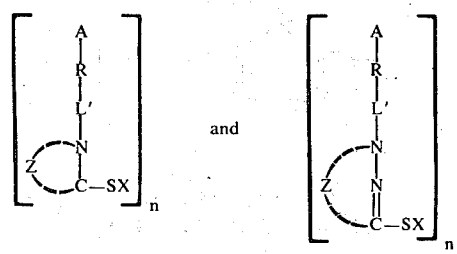

wherein A is an ethylenically unsaturated substituent which has been polymerized, R is a resonance stabilized group, L' is an optional linking group, X is hydrogen, ammonium or metal, Z represents the atoms and bonds necessary to complete a tetrazole ring and $n$ is an integer of at least 100.

For example, among the specific 1,2,3,4-tetrazole compounds included within the scope of this invention are:

poly [1-(p-vinylphenyl)1,2,3,4-tetrazole-5-thiol],

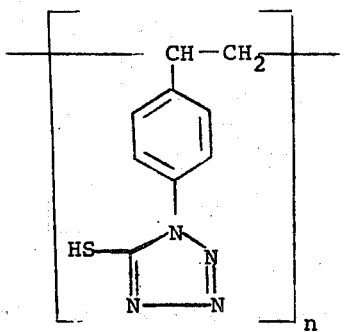

poly[1-(p-vinylbenzyl)-1,2,3,4-tetrazole-5-thiol],

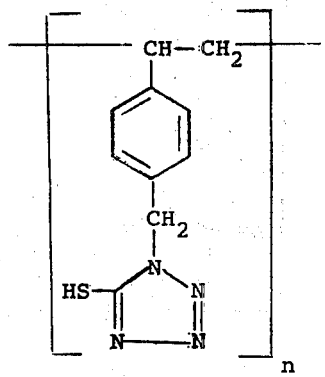

poly[1-(m-acrylamido-phenyl)-1,2,3,4,-tetrazole-5-thiol],

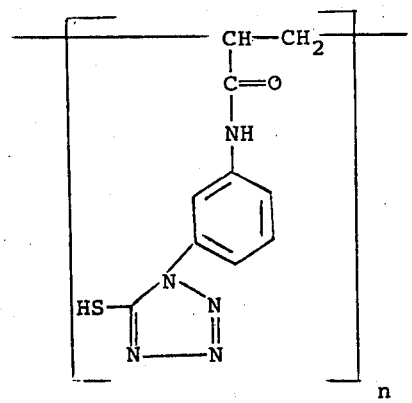

poly[1-(m-(2-acrylamido-2-methyl)-propionamidophenyl)-1,2,3,4,-tetrazole-5-thiol],

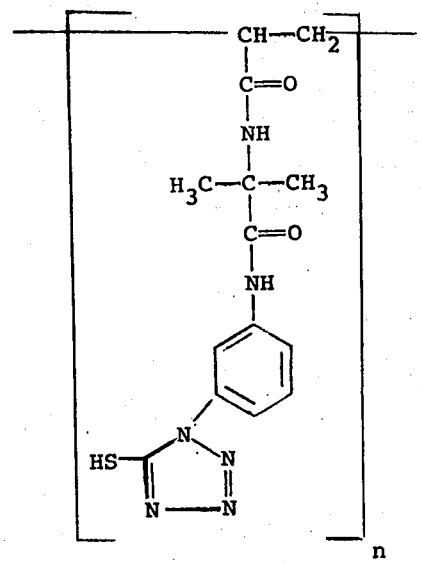

1-(p-formylphenyl)-tetrazole-5-thiol polyvinyl acetal

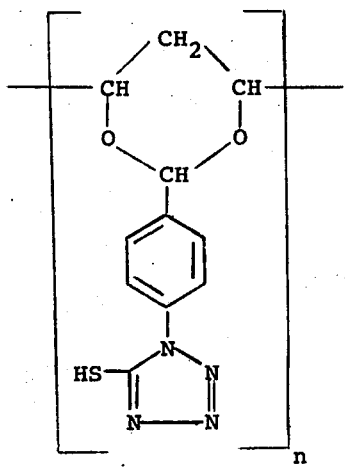

Alkali metal or other soluble salts of these tetrazoles may be used as gelatin thickeners for photographic emulsions. Unlike many other polymeric compounds, they are compatible with gelatin and exhibit no appreciable phase separation. Furthermore, they do not appear to desensitize silver halide emulsions like most reactive sulfur containing compounds. This may be due to steric hindrance which inhibits adsorption of the tetrazole sulfur onto silver.

The above described tetrazoles may be prepared by reacting the corresponding isothiocyanate having a polymerizable monomeric substituent in the para or meta position with an azide to convert the isothiocyanate moiety to a tetrazole moiety, effecting polymerization by treating said tetrazolated product with an acyl halide to acylate the tetrazole sulfur, polymerizing the monomeric substituent of the acylated product in the presence of a tetrasubstituted azo-bis-acetonitrile catalyst and de-acylating the polymerized product with a metal or ammonium hydroxide to produce the corresponding metal or ammonium salt of said tetrazole. A second, preferred and novel method of polymerizing the tetrazolated product is disclosed in U.S. Pat. application Ser. No. 520,982 filed Nov. 5, 1974 entitled "Polymerization of Sulfur Containing Compounds in Aqueous Media Utilizing a Tetrasubstituted Azo-Bis-Acetonitrile Polymerization Catalyst" filed simultaneously with this application by M. J. Grasshoff. The salt product of these two polymerization procedures is acidified to yield the thiol form.

The following examples are given to further illustrate the composition and preparation of such compounds and are not intended to limit the invention's scope.

EXAMPLE 1

Poly[1-(p-vinylphenyl)-1,2,3,4-tetrazole-5-thiol] and its sodium salt were prepared in the following manner.

P-vinylphenyl isothiocyanate was prepared by a modification of the procedure of Overberger and Friedman (7 Org. Chem. 30, 1926-9, 1965). To a stirred mixture of 60 g of $CaCO_3$, 0.1 g of 4,6-di-tert-butylcatechol, 120 ml of distilled water and 600 ml of trichloromethane were added, at approximately 15°C, 100 g (0.87 moles) of thiocarbonyl chloride. This was followed by gradual addition of 96 g (0.81 moles) of p-vinylaniline at 14°–16°C over a period of 45 minutes. The reaction mixture was stirred at room temperature for an additional 2 hours and then filtered and transferred to a separatory funnel. The aqueous phase was extracted with 50 ml of $CHCl_3$. The combined trichloromethane layers were dried over Drierite and distilled to yield 96 g (71%) of p-vinylphenyl isothiocyanate,

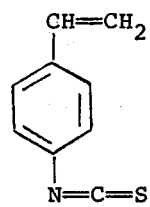

boiling in the range of 87°–90°C at 0.5 mm. and melting in the range of 30°–31°C. Analysis of the C₉H₇NS product showed actual percentage yields of C: 66.5; H: 4.4; N: 8.9; S: 19.3 as compared to theoretical percentage yields of C: 66.8; H: 4.4; N: 8.8; S: 19.8.

1-(p-vinylphenyl)-1,2,3,4-tetrazole-5-thiol was then prepared according to the procedure of Lieber and Ramachandran (Chem. & Ind. 1958, 461–2). A well-agitated mixture comprising 32.2 g (0.20 moles) of the p-vinylphenyl isothiocyanate prepared above and 14.3 g (0.22 moles) of sodium azide in 500 ml distilled water was heated under a nitrogen blanket at 70°–75°C for 2 hours and then at 90°C for 15 minutes. Upon cooling, the flask contents were filtered to remove a small amount of yellowish solids and the filtrate was extracted with two 150 ml portions of diethyl ether. The free acid was precipitated by gradual addition of 50 ml of 6 N hydrochloric acid. The precipitate was repeatedly washed with a total of 1 l. of distilled water. Recrystallization from benzene provided 28.5 g (70%) of slightly yellow crystals of 1-(p-vinylphenyl)-1,2,3,4-tetrazole-5-thiol,

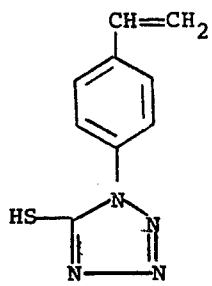

melting in the range of 150°–2°C. Analysis of the C₉H₈N₄S showed actual percentage yields of C: 53.2; H: 4.0; N: 27.5; S: 15.5 as compared to theoretical percentage yields of C: 53.2; H: 3.9; N: 27.5; S: 15.6.

1-(p-vinylphenyl)-5-acetylthio-1,2,3,4-tetrazole was then prepared in the following manner. To 12.2 g (0.05 moles) of the 1-(p-vinylphenyl)-1,2,3,4,-tetrazole-5-thiol prepared above were added 5.8 g (0.069 moles) of sodium bicarbonate in 250 ml of distilled water to yield a solution containing the sodium salt of 1-(p-vinylphenyl)-1,2,3,4-tetrazole-5-thiol. This sodium thiolate was flash evaporated. The solid residue was taken up on 250 ml of acetone and then filtered. 5.0 g (0.064 moles) of acetyl chloride were added dropwise to the filtrate at room temperature with stirring. Stirring of the mixture was continued for 1 hour at 40°C. Filtration and solvent evaporation gave a solid residue which was recrystallized from CHCl₃/hexane to yield 14.2 g (95%) of colorless needles of a mixture comprising 1-(p-vinylphenyl)-5-acetylthio-1,2,3,4-tetrazole,

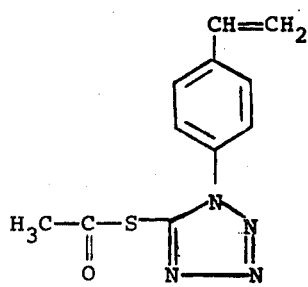

and 1-(p-vinylphenyl)-4-acetyl-2-tetrazoline-5-thione melting in the range of 102°–105°C (after sintering). Analysis of the C₁₁H₁₁N₄SO product showed actual percentage yields of C: 53.5; H: 4.5; N: 22.8; S: 12.9 as compared to theoretical percentage yields of C: 53.5; H: 4.5; N: 22.7; S: 12.9.

Poly[1-(p-vinylphenyl)-1,2,3,4-tetrazole-5-thiol] and its sodium salt were then prepared in the following manner. 5 g of the acetyl derivative prepared above were dissolved in 35 ml of toluene and the solution heated at 60°C in a sealed evacuated tube with 0.01 g of 2,2'-azo-bis(2-methylpropionitrile) for 16 hours. The resinous polymerized precipitate (5 g),

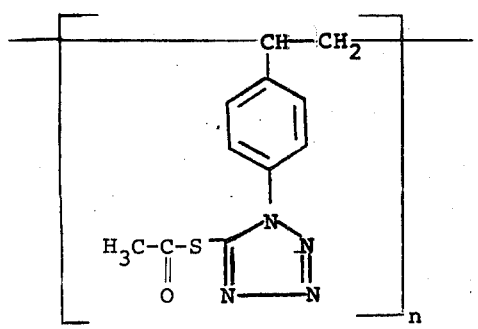

was purified by reprecipitation from 2-butanone into methanol. The purified material (4 g) was dissolved in 50 ml H₂O containing 3.3 ml of 50% of NaOH and then dialyzed through regenerated cellulose tubing using distilled water. Freeze drying of the remaining solution gave 3 g of a high molecular weight sodium salt of poly[1-(p-vinylphenyl-1,2,3,4-tetrazole-5-thiol],

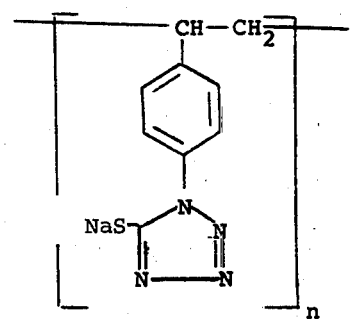

This was dissolved in 30 ml H₂O and transformed into the free polymeric thiol by acidification with 6 N hydrochloric acid. Centrifuging of the acidified product yielded 2.5 g of a yellowish powder. Analysis of the (C₉H₈N₄S)ₙ product showed actual percentage yields of C: 52.5; H: 4.1; N: 27.2; S: 15.3 as compared to theoretical percentage yields of C: 53.2; H: 3.9; N: 27.5; S: 15.6.

EXAMPLE 2

The potassium salt of the tetrazole thiol prepared in Example 1 was prepared according to the method disclosed in aforementioned U.S. Pat. application No. (our Case No. 5254) where the vinylphenyl tetrazole thiol is polymerized in an aqueous medium in the presence of a tetra-alkylated azo-bis-acetonitrile catalyst masking the sulfur substituent. By acidifying the salt product the free thiol can be obtained.

EXAMPLE 3

The potassium salt of poly[1-(p-vinylbenzyl)-1,2,3,4-tetrazole-5-thiol] was prepared by the same method as that utilized in Example 2.

Vinylbenzyl isothiocyanate was prepared in the following manner. 76 g (0.5 moles) of vinylbenzyl chloride were dissolved in 300 ml of dimethylformamide (DMF). To this solution were added 56 g (0.575 moles) of potassium thiocyanate and 28 g (0.187 moles) of sodium iodide. The mixture was heated for 30 minutes at 150°C and then the major portion of DMF was flashed off with a water aspirator vacuum. The solid flask residue was extracted with 750 ml of diethyl ether. The filtered diethyl ether phase yielded 80 g of yellowish liquid. Vacuum distillation gave 30 g (35% yield) of pale yellow vinylbenzyl isothiocyanate liquid,

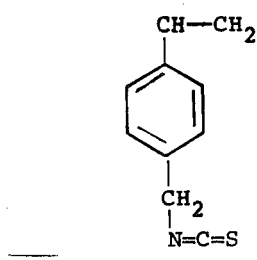

boiling at 135°C at 0.5 mm. Analysis of the $C_{10}H_9NH$ product showed actual percentage yields of C: 68.8; H: 5.2; N: 8.9; S: 18.3 as compared to thoretical percentage yields of C: 69.0; H: 5.5; N: 8.6; S: 17.7.

1-(p-vinylbenzyl)-1,2,3,4-tetrazole-5-thiol was prepared in the following manner. 15 g (0.087 moles) of vinylbenzyl isothiocyanate were added to a vigorously stirred solution comprising 6.2 g (0.095 moles) of sodium azide in 200 ml of water maintained at 90°–95°C. The mixture was stirred at 90°C for 3 hours and then acidified to give 7 g (34% yield) of white, solid 1-(p-vinylbenzyl)-1,2,3,4-tetrazole-5-thiol,

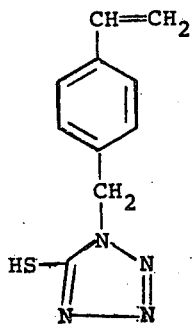

melting in the range of 90°–100°C. Analysis of the $C_{10}H_{10}N_4S$ product showed actual percentage yields of C: 55.2; H: 4.6; N: 25.6; S: 18.3 as compared to theoretical percentage yields of C: 55.5; H: 4.8; N: 25.0; S: 14.0.

Poly[1-(p-vinylbenzyl)-1,2,3,4-tetrazole-5-thiol] was then prepared in the following manner. 4 g of 1-(p-vinylbenzyl)-1,2,3,4-tetrazole-5-thiol were dissolved in 30 ml of water containing 4 g of potassium carbonate and 20 mg of 2,2'-azo-bis(2-methylpropionitrile). This was heated for 16 hours in a sealed tube. The resultant viscous solution was dialyzed for 20 hours and freeze dried to give 4.2 g of the potassium salt of poly[1-(p-vinylbenzyl)-1,2,3,4-tetrazole-5-thiol],

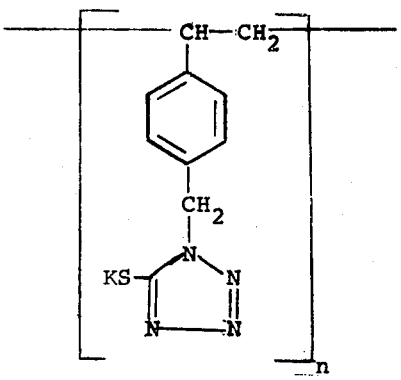

Acidification of the salt product will again yield the free thiol.

EXAMPLE 4

The potassium salt of poly[1-(m-acrylamidophenyl)-1,2,3,4-tetrazole-5-thiol],

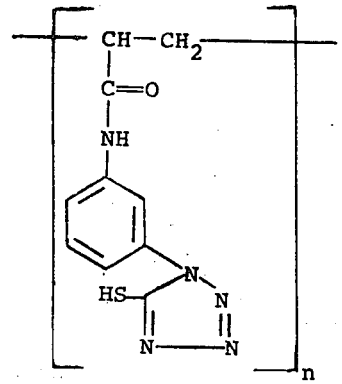

was prepared according to the method disclosed in aforementioned U.S. Pat. application Ser. No. 520,982 where the acrylamidophenyl tetrazole thiol is polymerized in an aqueous medium in the presence of a tetraalkylated azo-bis-acetonitrile catalyst without masking the sulfur substituent. The free thiol is then obtained via acidification.

Although the sodium and potassium salts of polymeric tetrazoles were prepared in the above examples, other monovalent metal salts or mixtures of metal salts, especially those from Group 1A such as lithium, rubidium and cesium, as well as amine and ammonium salts, can of course be prepared. When soluble thiolates such as these are utilized as thickeners in gelatino silver halide emulsions, concentrations of up to 50% by weight of the gelatin have been found useful.

The viscosity increasing properties of such thiolates is illustrated below where Rousselot inert gelatin emulsions containing various amounts of the potassium salt of poly[1-(p-vinylphenyl)-1,2,3,4-tetrazole-5-thiol], abbreviated as $K^+$ PVPMT, were compared with those containing corresponding amounts of a known thickener, the potassium salt of polyvinylhydrogenphthalate abbreviated as $K^+$ PVHP. In each case the gelatin concentration was 5.0% w/v. The viscosity was measured at 42°C with a Brookfield viscometer (model LV) having a No. 1 spindle revolving at 12 R.P.M.

| Gelatin w/v* mg/100 | K+ Salt of Polymeric cc**/100 Thickener | K+ PVHP Viscosity (pH 6.9) | K+ PVPMT Viscosity (pH 7.1) |
|---|---|---|---|
| 0 | 0 | 8 | 8 |
| 49.4 | 1 | 10 | 13 |
| 98.8 | 2 | 15 | 17.5 |
| 197.8 | 4 | 35 | 52.5 |
| 296.4 | 6 | 75 | 185 |
| 395.2 | 8 | 143 | 563 |

*weight of gelatin per volume of solvent
**cc of 4.94% polymer

Other polymerizable substituents such as isoprene can be used in place of vinyl. Other linking groups which do not interfere with the polymerization process may also be employed with, or instead of, phenyl such as benzyl, aminophenyl and (2-amino-2-methyl)-propionamidophenyl. It will be appreciated that the tetrazole compounds of this invention may contain substituents other than those specified as may be readily selected by those skilled in the art. Since other substitutions and changes may be made in the above products and processes without departing from the scope of the disclosed invention, it is intended that all matter contained in the foregoing description shall be interpreted as illustrative and not in a limiting sense.

What is claimed is:

1. A compound selected from:

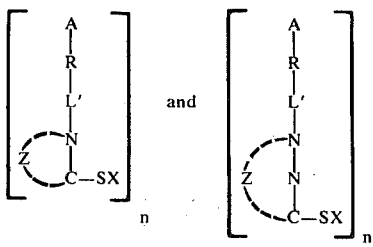

wherein A is an ethylenically unsaturated substituent which has been polymerized, R is a resonance stabilized group, L' is an optional linking group, X is hydrogen, ammonium or metal, Z represents the atoms and bonds necessary to complete a tetrazole ring and $n$ is an integer of at least 100.

2. A compound of claim 1 wherein X is ammonium, or monovalent metal.

3. A compound of claim 1 wherein A is vinyl, R is phenyl, and Z represents the atoms and bonds necessary to complete a 1,2,3,4-tetrazole ring.

4. A compound of claim 3 which is poly[1-(p-vinylphenyl)-1,2,3,4-tetrazole-5-thiol].

5. A compound of claim 3 which is a monovalent metal, or ammonium salt of poly[1-(p-vinylphenyl)-1,2,3,4,-tetrazole-5-thiol].

6. A compound of claim 5 wherein said salt is a sodium salt.

7. A compound of claim 5 wherein said salt is a potassium salt.

8. A compound of claim 3 which is poly[1-(p-vinylbenzyl)-1,2,3,4,-tetrazole-5-thiol].

9. A compound of claim 3 which is a monovalent metal, or ammonium salt of poly[1-(p-vinylbenzyl)-1,2,3,4-tetrazole-5-thiol].

10. A compound of claim 9 wherein said salt is potassium.

11. A compound of claim 1 wherein A is vinyl, R is carbonyl and Z represents the atoms and bonds necessary to complete a 1,2,3,4-tetrazole ring.

12. A compound of claim 11 which is poly[1-(m-acrylamidophenyl)-1,2,3,4-tetrazole-5-thiol].

13. A compound of claim 11 which is a monovalent metal, or ammonium salt of poly[1-(m-acrylamidophenyl)-1,2,3,4-tetrazole-5-thiol].

14. A composition comprising gelatin and a compound of claim 2.

15. A composition comprising gelatin and a compound of claim 5.

16. The composition of claim 15 wherein said compound of claim 5 is present in a concentration of up to 50% by weight of gelatin.

17. The composition of claim 16 wherein X is potassium.

* * * * *